United States Patent [19]

Peleg

[11] Patent Number: 5,022,240
[45] Date of Patent: Jun. 11, 1991

[54] GARMENT BLANK AND BRIEF
[75] Inventor: Eliezer Peleg, New York, N.Y.
[73] Assignee: Sara Lee Corporation, Winston-Salem, N.C.
[21] Appl. No.: 307,887
[22] Filed: Feb. 7, 1989
[51] Int. Cl.⁵ ................................................ A41B 9/02
[52] U.S. Cl. ............................................ 66/177; 2/408
[58] Field of Search ................ 66/175, 176, 177, 189; 2/406, 408

[56] References Cited

U.S. PATENT DOCUMENTS

| | | | |
|---|---|---|---|
| 2,548,660 | 4/1951 | Feldman | 2/408 |
| 4,010,627 | 3/1972 | Pernick | 66/177 |
| 4,043,156 | 8/1977 | Pernick | 66/177 |
| 4,597,110 | 7/1986 | Smith et al. | 2/406 X |
| 4,624,115 | 11/1986 | Safrit et al. | 66/177 X |
| 4,637,078 | 1/1987 | Southwell | 2/408 |
| 4,675,918 | 6/1987 | O'Brien | 2/408 X |
| 4,682,479 | 7/1987 | Pernick | 66/176 |
| 4,835,795 | 6/1989 | Lonon | 2/408 |

FOREIGN PATENT DOCUMENTS 665760 10/1965 Belgium ................................ 2/406

Primary Examiner—Werner H. Schroeder
Assistant Examiner—John J. Calvert

[57] ABSTRACT

A blank for panties or briefs having a tubular knit body formed of 360° courses and a single panel extending from a portion of the last course are formed on a circular knitting machine. The single panel is knit with vertical sides along respective wales. Guide lines are knit into the body section and the single panel to provide a cutting guide for the proper shape for leg openings.

15 Claims, 1 Drawing Sheet

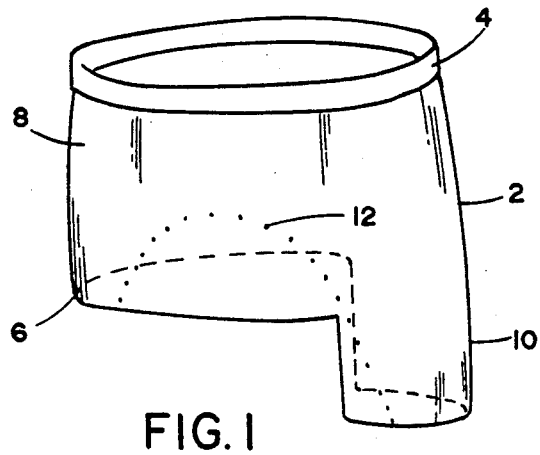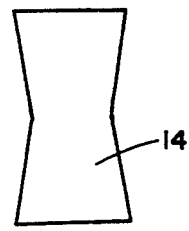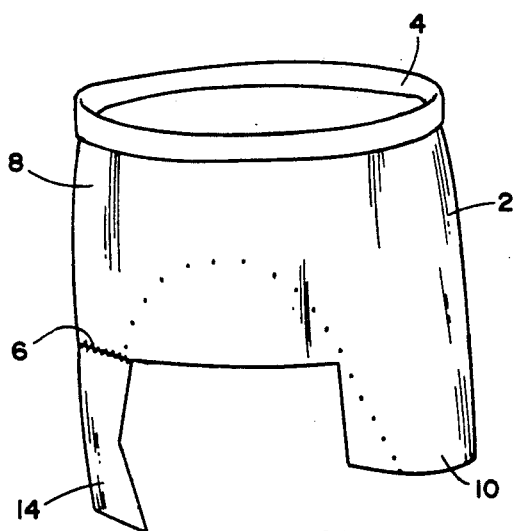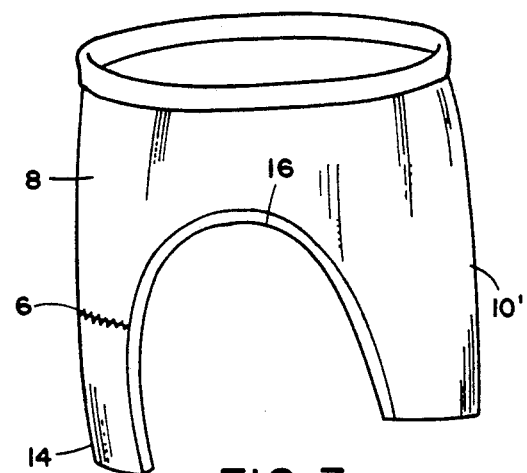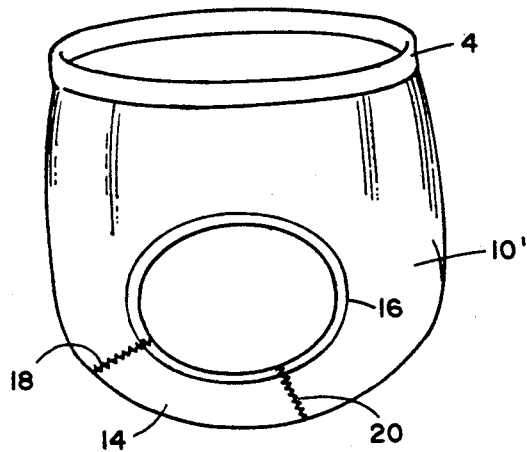

GARMENT BLANK AND BRIEF

BACKGROUND OF THE INVENTION

Panties and briefs have been made by cutting diametrically opposed leg openings in one end of a tubular blank formed by a circular knitting machine and joining the ends of the blank that are between the leg openings. Since the material in the leg openings is about one 20% of all the material used in a panty or brief, there is considerable waste.

This method of manufacture is described in U.S. Pat. No. 4,624,115 ('115), wherein a tubular blank is formed by a circular knitting machine with areas on opposite sides having a stitch that differs in appearance from the rest of the blank so as to form a line of demarcation that can serve as a cutting guide. The ends of the tubular blank between these areas are sewn together to form a crotch piece and leg openings.

U.S. Pat. No. 4,093,156 ('156) proposed that shaped panels appending from the front and rear of a tubular body be formed by a circular knitting machine and that the ends of the panels be overlapped and sewn together so as to form a member that extends through the crotch. Each panel is widest where it joins the tubular body and gradually reduces in width until it meets an end portion of constant width. Whereas this saves material, high speed production is difficult to obtain. Furthermore, because of the tendency for the edges of the leg openings thus formed to ripple and pucker, it is difficult to trim them with elastic material or the like so as to cover the floats or ends of yarn that are necessarily present at the edges of the panels.

BRIEF SUMMARY OF THE INVENTION

In accordance with this invention, a circular knitting machine knits a given number of 360° courses to form the body section of a brief or panty. During the last course, needles extending around more than half of the knitting circle are pressed off while the remaining needles continue to knit on that course and subsequent courses so as to form a generally rectangular rear panel having vertical sides along respective wales. Cutting guide lines are knit into the body section and the rear panel as required to provide shapes for leg openings. This structure can be made rapidly without difficulty. One end of a separate crotch piece is sewn to the body section, the leg openings are cut in the body section and rear panel along the knitted guide line. This is easy to do with accuracy because there are no tapered edges that ripple or pucker. The other end of the crotch piece is then sewn to the panel. Very little yarn is wasted because the yarn that is cut out occupies only a small portion of the leg openings.

BRIEF DESCRIPTION OF THE DRAWINGS

FIG. 1 shows the blank of this invention formed by a circular knitting machine,

FIG. 2 shows a crotch piece,

FIG. 2A shows a blank of FIG. 1 with one end of the crotch piece of FIG. 2 attached to it, FIG. 3 shows the blank and crotch piece of FIG. 2A that are cut along a guide line for a leg opening, and FIG. 4 shows a complete panty or brief made with a blank of this invention.

DETAILED DESCRIPTION OF THE INVENTION

The blank 2 shown in FIG. 1 is formed by a circular knitting machine. As is customary, a transfer or double welt 4 of elastic yarn is knit at the top so as to form a waistband, and the machine continues knitting complete circular courses until a course 6 is reached so as to form a tubular body section 8. At this point, needles around more than half the circumference of the body section 8 are pressed off while the remaining needles continue to knit in the course 6 and subsequent courses so as to form a rear panel 10 having vertical sides along wales not shown. A dashed line 12 that serves as a cutting guide to provide the proper shape for a leg opening is formed by the knitting machine in any suitable manner e.g., by tuck stitches or different color yarn at appropriate course/wale intersections in the body section 8 and the rear panel 10. A similar cutting guide line, not shown, is formed on the other side of the blank.

FIG. 2 shows a suitably shaped crotch piece 14, and FIG. 2A shows one side of the blank 2 of FIG. 1 with one end of the crotch piece 14 sewn to the body section 8. At this point both sides of the blank 2 are cut along its guide lines 12, so as to form a shaped rear panel 10', and trimming 16 is sewn around the cut edge as shown in FIG. 3.

FIG. 4 shows the final panty or brief in which the crotch piece 14 and the panel 10' are overlapped with the crotch piece 14 on the outside and sewn together as indicated by seams 18 and 20.

It has been found that the blank 2 comprised of the transfer 4 of elastic yarn, the tubular body 8 and the panel 10 can be made by a circular knitting machine. Less yarn is wasted by knitting the body 8 and panel in this manner because only a small portion of the knit fabric is cut out in order to form the leg openings. Furthermore, because the sides of the rear panel 10 are along wales it does not curl so that the cutting and sewing along the guide line 12 can be efficiently done. The cutting and sewing are also made easier because there are no floats or yarn endings that can interfere.

What is claimed is:

1. A circular knit blank for use in the manufacture of panties or briefs comprising:
    (a) a tubular knit body having 360° courses;
    (b) a course at the bottom of said body having pressed off contiguous stitches for a given number of degrees around said course, and
    (c) a single panel knit to said course and extending around the remainder of the degrees around said course, said panel having parallel sides along respective wales uniformly extending from the pressed off contiguous stitches..

2. A blank as set forth in claim 1 wherein cutting guide lines for leg openings are knit into said tubular body, said cutting guide lines being symmetrically located on either side of said panel.

3. A blank as set forth in claim 1 further comprising an elastic transfer knit to said tubular body around the end opposite said panel.

4. A blank as set forth in claim 1 wherein cutting guide lines for leg openings are knit into opposite sides of said tubular body and said panel.

5. A blank as set forth in claim 4 wherein an elastic transfer is knit to an end of said tubular knit body opposite said rear panel to form a waistband.

6. A panty or brief comprising:

(a) a blank as set forth in claim 5 that has been cut along said guide lines,
(b) a crotch piece having one end sewn to said tubular body, and
(c) said crotch piece and said panel being sewn together so as to form leg openings.

7. A panty or brief as set forth in claim 6 further comprising trimming material sewn around the edges of said leg openings.

8. The blank as set forth in claim 1 wherein said panel is generally rectangular in plan.

9. A method of making a blank to be used in the manufacture of brief or panties comprising:
   (a) knitting a number of courses on a circular knitting machine so as to form a tubular body section;
   (b) pressing off a contiguous number of stitches in the last course of said tubular body section around a given portion of said last course, and
   (c) continuing knitting to the remaining portion of said last course a single rear panel having vertical sides extending along respective wales.

10. The method as set forth in claim 9 wherein said panel is generally rectangular in plane.

11. A panty or brief comprising:
   (A) a tubular knit body having 360° courses, a course at the bottom of said body having pressed off stitches for a given number of degrees around said bottom course;
   (B) a single panel knit to the rest of said bottom course; and
   (C) a crotch piece having one end sewn to said tubular body and the other end sewn to said panel;
   partial leg openings being symmetrically cut into said tubular body and panel on either side of said panel, and said crotch piece and said panel being sewn together so as to form leg openings.

12. The panty or brief as set forth in claim 11 wherein said crotch piece is generally rectangular in plan.

13. A panty or brief as set forth in claim 11 further comprising trimming material sewn around the edges of said leg openings.

14. The method of making a panty or brief comprising the steps of:
   (A) knitting a tubular body having 360° courses, a course at the bottom of said body having pressed off stitches for a given number of degrees around said bottom course;
   (B) knitting a single panel to the rest of said bottom course; and
   (C) cutting partial leg openings symmetrically into said tubular body and panel on either side of said panel and sewing one end of a crotch piece to said tubular body and the other end thereof to said panel, said crotch piece and said panel being sewn together so as to form leg openings.

15. The method as set forth in claim 14 wherein said crotch piece is generally rectangular in plan.

* * * * *